US009239626B1

(12) United States Patent
Wu et al.

(10) Patent No.: US 9,239,626 B1
(45) Date of Patent: Jan. 19, 2016

(54) INPUT SYSTEM

(71) Applicant: Google Inc., Mountain View, CA (US)

(72) Inventors: Bo Wu, Alhambra, CA (US); David Sparks, Cupertino, CA (US); Michael Patrick Johnson, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 177 days.

(21) Appl. No.: 13/933,905

(22) Filed: Jul. 2, 2013

(51) Int. Cl.
G06F 3/01 (2006.01)
(52) U.S. Cl.
CPC ..................................... G06F 3/017 (2013.01)
(58) Field of Classification Search
CPC .............................. G06F 3/013; G02B 27/0093
See application file for complete search history.

(56) References Cited

U.S. PATENT DOCUMENTS 7,091,928 B2 * 8/2006 Rajasingham ................... 345/7
2012/0206452 A1 8/2012 Geisner et al.
2013/0293488 A1 * 11/2013 Na et al. ................. G06F 3/013 345/173

FOREIGN PATENT DOCUMENTS

EP 2 486 450 A1 8/2012
WO 2011156195 A2 12/2011

* cited by examiner

Primary Examiner — Amare Mengistu
Assistant Examiner — Shawna Stepp Jones
(74) Attorney, Agent, or Firm — McDonnell Boehnen Hulbert & Berghoff LLP

(57) ABSTRACT

Examples of methods and systems for using eye gesture duration to provide calibration for eye gesture detection are described. In some examples, calibration can be executed using a head-mountable device. The head-mountable device may be configured to determine a duration range indicative of an eye gesture and receive a plurality of reference signals indicative of the eye gesture. The plurality of reference signals may comprise duration information indicative of a plurality of reference durations of the eye gesture. The head-mountable device may determine, based on the plurality of reference durations, a reference duration range associated with the eye gesture that is within the duration range, and adjust the duration range for the eye gesture based on the reference duration range.

18 Claims, 10 Drawing Sheets

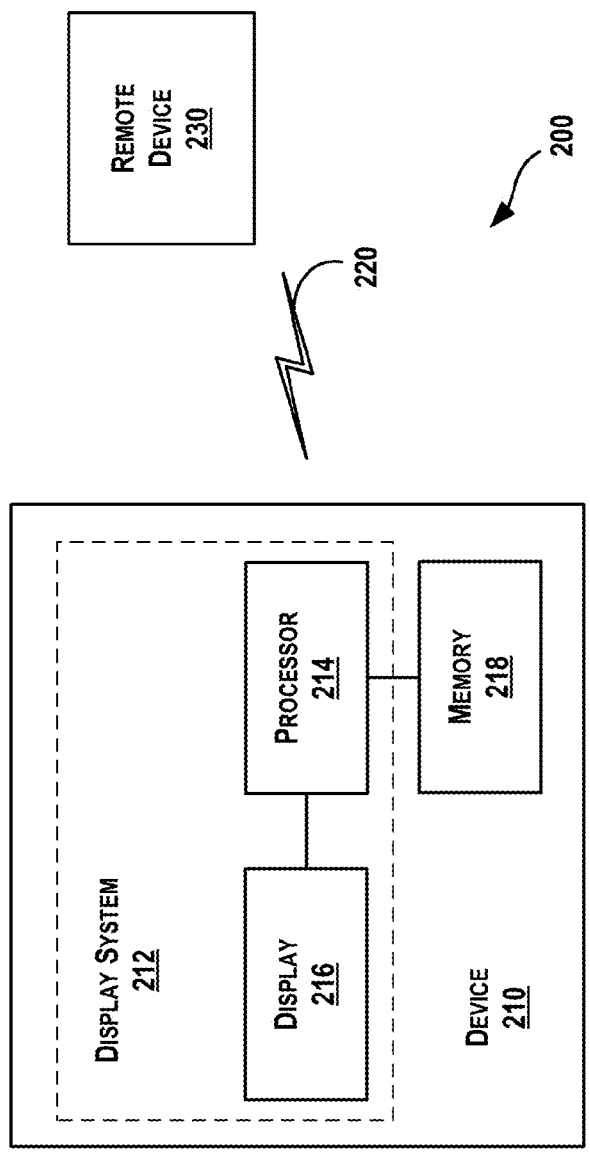

INPUT SYSTEM

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

This disclosure may disclose methods and systems that use eye gesture duration information to improve proximity sensor based eye gesture detection.

In one example, a method is provided. The method may include determining, using a computing device, a duration range indicative of an eye gesture. The method may also include receiving a plurality of reference signals indicative of the eye gesture. The plurality of reference signals may comprise duration information indicative of a plurality of reference durations of the eye gesture. The method may additionally include determining, based on the plurality of reference durations, a reference duration range associated with the eye gesture. The reference duration range may be within the duration range. The method may further include adjusting the duration range for the eye gesture based on the reference duration range.

In another example, a system is provided. The system may include a head mountable device (HMD) configured to receive a plurality of reference signals indicative of an eye gesture from a device coupled to the HMD. The system may also include a computer-readable medium and program instructions stored on the computer-readable medium and executable by at least one processor to perform functions. The functions may include determining a duration range indicative of the eye gesture. The functions may also include receiving a plurality of reference signals indicative of the eye gesture. The plurality of reference signals may comprise duration information indicative of a plurality of reference durations of the eye gesture. The functions may additionally include determining, based on the plurality of reference durations, a reference duration range associated with the eye gesture. The reference duration range may be within the duration range. The functions may further include adjusting the duration range for the eye gesture based on the reference duration range.

In a further example, a non-transitory computer readable medium having stored therein instructions executable by a computing device to cause the computing device to perform functions is disclosed. The functions may include determining a duration range indicative of the eye gesture. The functions may also include receiving a plurality of reference signals indicative of the eye gesture. The plurality of reference signals may comprise duration information indicative of a plurality of reference durations of the eye gesture. The functions may additionally include determining, based on the plurality of reference durations, a reference duration range associated with the eye gesture. The reference duration range may be within the duration range. The functions may further include adjusting the duration range for the eye gesture based on the reference duration range.

In yet another example, another system is provided that may involve a means for determining a duration range indicative of an eye gesture. The system may further include a means for receiving a plurality of reference signals indicative of the eye gesture. The plurality of reference signals may comprise duration information indicative of a plurality of reference durations of the eye gesture. The system may additionally include a means for determining, based on the plurality of reference durations, a reference duration range associated with the eye gesture. The reference duration range may be within the duration range. The system may further include a means for adjusting the duration range for the eye gesture based on the reference duration range.

The foregoing summary is illustrative only and is not intended to be in any way limiting. In addition to the illustrative aspects, examples, and features described above, further aspects, examples, and features will become apparent by reference to the figures and the following detailed description.

BRIEF DESCRIPTION OF THE FIGURES

FIG. 2A is a simplified block diagram of a computing device according to an example embodiment.

DETAILED DESCRIPTION

Figure 1A:
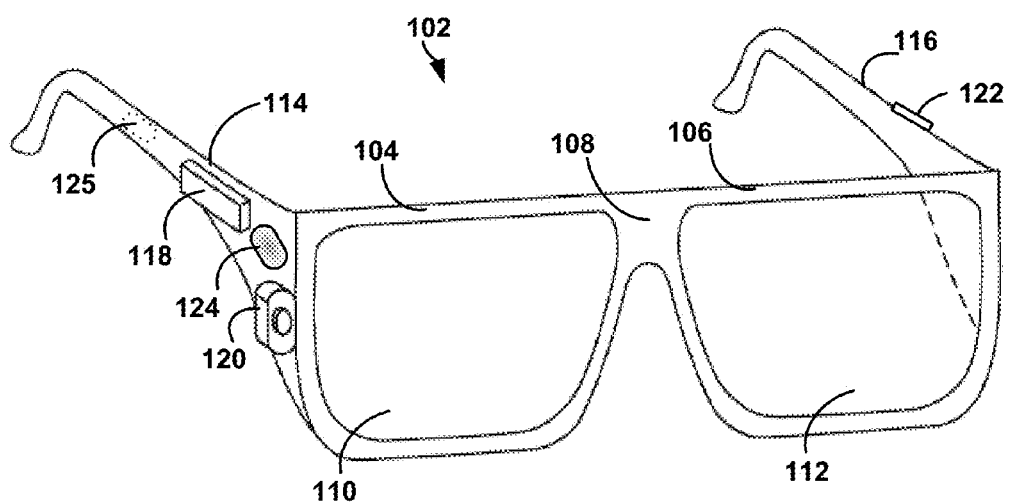
FIG. 1A illustrates a wearable computing system according to an example embodiment.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

A. Overview

This disclosure generally relates to methods and systems for providing calibration for eye gesture recognition that is associated with a head-mountable device (HMD), such as a glasses-style wearable computing device. Embodiments described herein may be used to calibrate a process that detects blinks, winks, and/or other eye gestures, and/or to provide other benefits. More specially, example embodiments may utilize duration information that may be provided in a proximity-sensor signal (or similar data) to aid the detection of blinks, winks, and/or other types of eye movements or gestures.

Generally, various eye movements or eye gestures may be associated with various durations (e.g., eye closing periods). Analyzing the duration associated with the eye gesture may facilitate the detection of the eye-gesture. For example, a duration indicative of a wink may generally range from 300 ms to 800 ms, while a duration of a blink may generally range from 100 ms to 300 ms. Knowing this, an HMD may determine whether a particular wearer is winking or blinking by determining which range the duration of the eye gesture falls into (e.g., if the eye of the wearer closes for 400 ms then the wearer may have performed a wink eye gesture).

It has been observed, however, that different people may have different durations associated with different eye gestures. In other words, the duration of eye gestures of different people may fall in a sub-range within the generally known duration-range for the particular eye gesture. For example, one person may have a duration of 350 ms when performing a wink eye-gesture, while another person may have a duration of 600 ms when performing a wink eye gesture. Further, it has been observed that a person with a shorter average eye gesture duration may have smaller eye gesture duration variation, while a person with a longer eye gesture duration may have larger eye gesture duration variation. Accordingly, when proximity-sensor data is obtained (e.g., over an interval of time) for two individuals, two different duration ranges may exist, the first range being indicative of a wink duration for the first individual and the second range being indicative of a wink duration for the second individual.

Accordingly, it may be beneficial for the HMD to calibrate its reference data (data obtained from proximity-sensor signals) by associating an observed or tailored range to a particular user or wearer of the HMD. Calibrating the reference data may include, while the HMD is being worn by a particular user, detecting eye gestures (e.g., a wink) of all possible durations and estimating the duration of the eye gesture. Using various sensors (or detectors) configured only to respond to eye gestures of certain duration ranges, the HMD may choose one of the sensors whose duration range matches the estimated duration most closely. The HMD may then classify the eye gesture to that duration range for that particular user.

Further, it has been observed that the eye gesture classifiers may not always be accurate, and may return false positives in addition to true positives. To mitigate such occurrences the duration of the detected gesture may be compared with the duration of gestures recorded during calibration. When too big of a difference exists between the detected duration and the durations recorded during calibration, the detection may be rejected as a false positive.

In an example embodiment, an HMD may be configured to determine a duration range associated with a wink eye-gesture. For example, the duration range may be 300 ms-800 ms. Upon a particular user wearing the HMD and performing wink eye-gestures, the HMD may receive various signals indicative of the wink and obtain duration information from each signal. Based on the various durations, the HMD may select a sub-range of the duration range that more accurately reflects the wink duration of the particular user. For example, the HMD may determine that the particular user has a duration range of 350 ms-500 ms for a wink eye-gesture. Using this information, the HMD may calibrate its system to recognize wink eye-gestures when an eye gesture falls within the sub range, or in this example, 350 ms-500 ms for that particular user.

B. Example Wearable Computing Devices

Systems and devices in which examples may be implemented will now be described in greater detail. In general, an example system may be implemented in or may take the form of a wearable computer (also referred to as a wearable computing device). In an example, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or a mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that the device may be worn on the head. Further, examples may be implemented by or in association with an HMD with a single display or with two displays, which may be referred to as a "monocular" HMD or a "binocular" HMD, respectively.

FIG. 1A illustrates a wearable computing system according to one example. In FIG. 1A, the wearable computing system may take the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens frames 104, 106 and a center frame support 108, lens elements 110, 112, and extending side-arms 114,116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that may suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) that may be used to track eye movements and/or determine the direction of a wearer's gaze. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
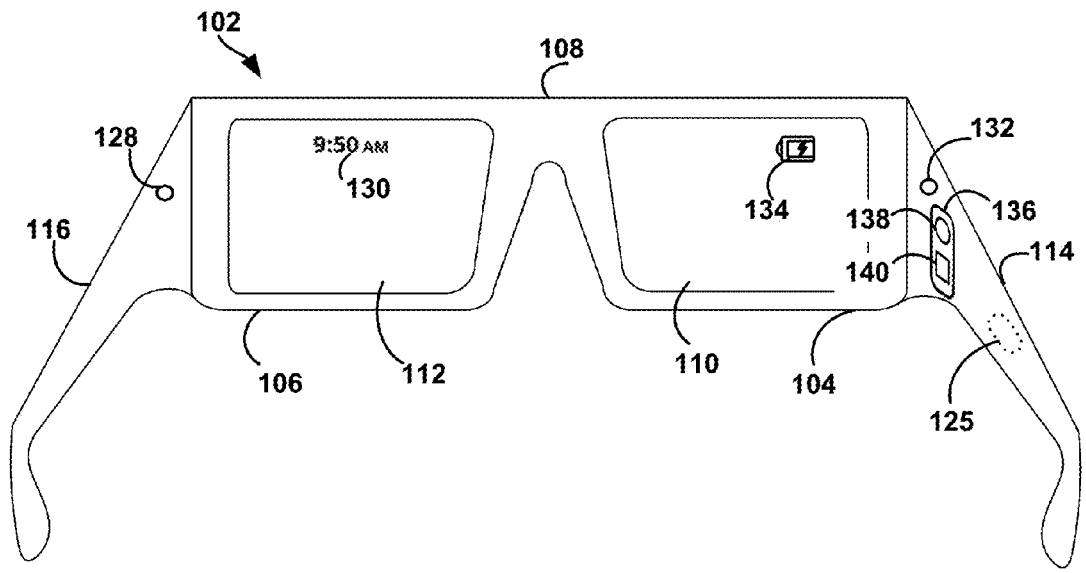
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
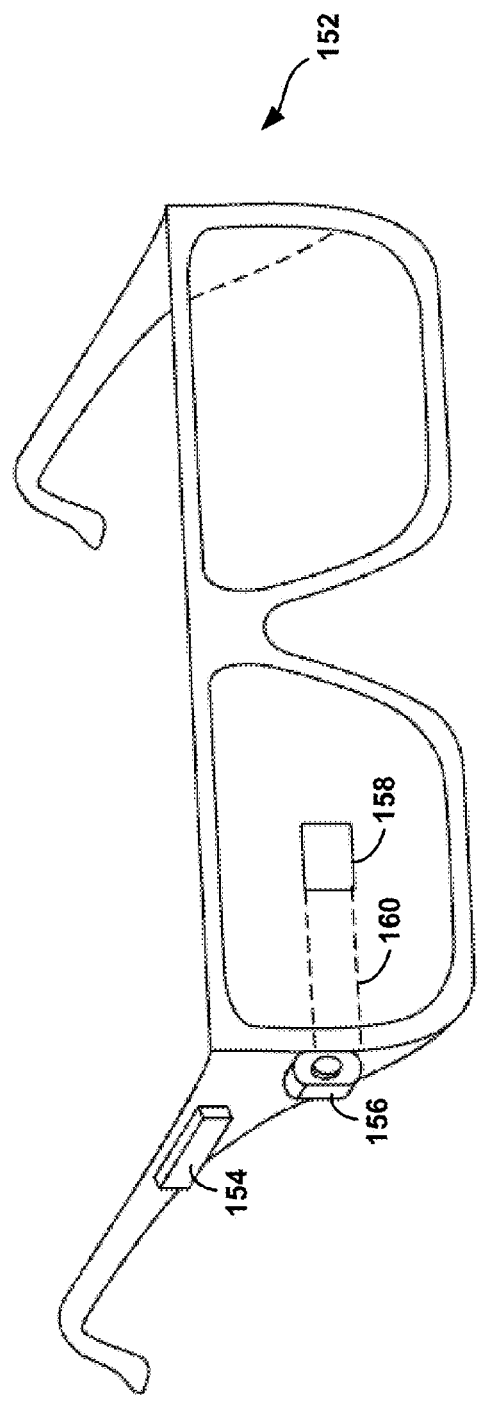
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

The eye gesture-detection system 136 is shown in FIG. 1B as a proximity-sensing system including a light source 138 and a light sensor 140 affixed to the extending side arm 114 of the HMD 102. Although the eye gesture-detection system 136 is shown as a proximity-sensing system, other types of eye gesture-detection systems may be used. As discussed below in connection with FIG. 2, an eye gesture-detection system may also include other numbers of light sources (including no light sources) and may include elements other than those shown in the an eye gesture-detection system 136. Additionally, the eye gesture-detection system may be arranged in other ways. For example, the light source 138 may be mounted separately from the light sensor 140. As another example, the eye gesture-detection system 136 may be mounted to other frame elements of the HMD 102, such as, for example, to the lens frames 104 or 106, to the center frame support 108, or to the extending side arm 116.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
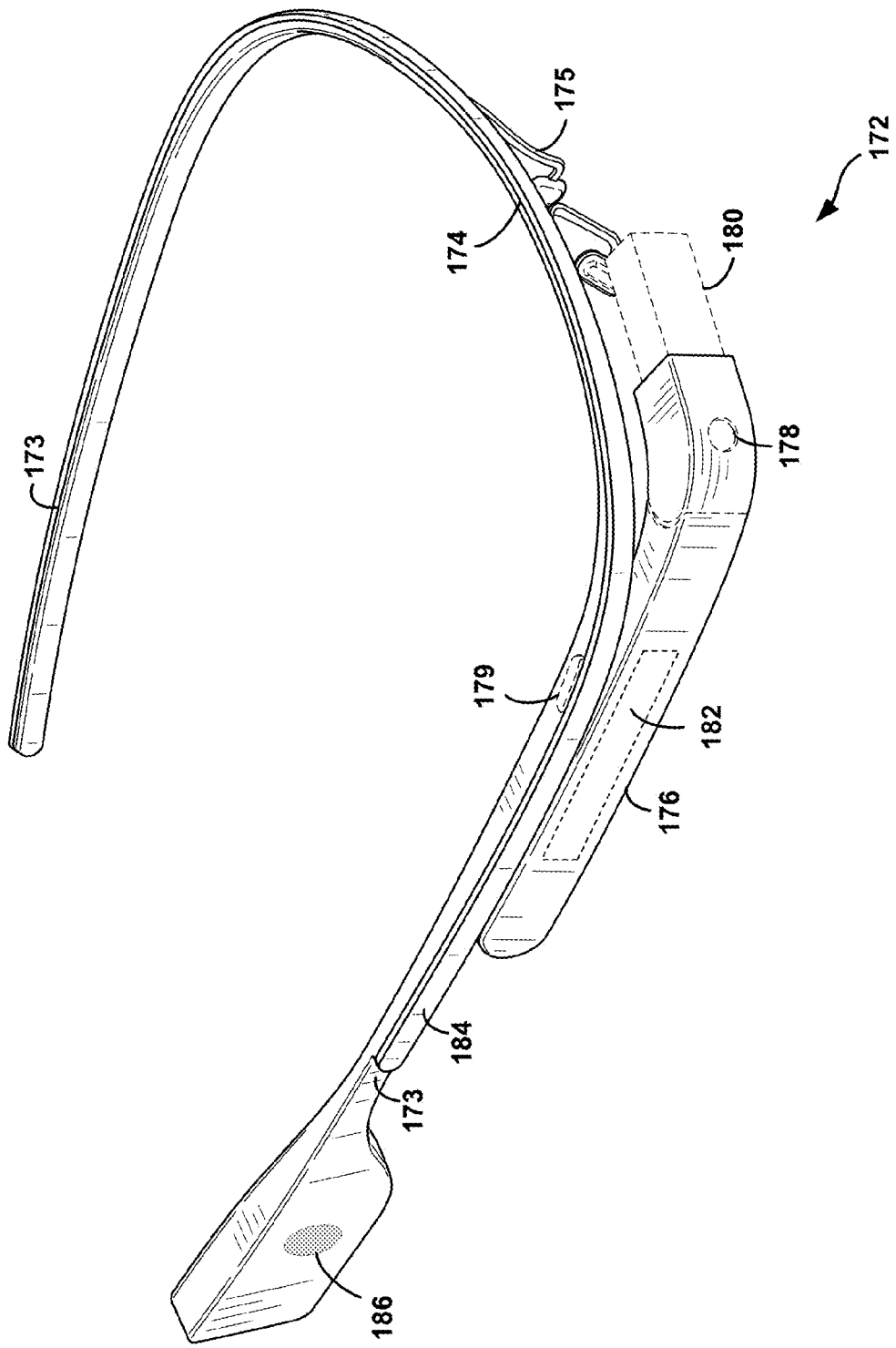
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
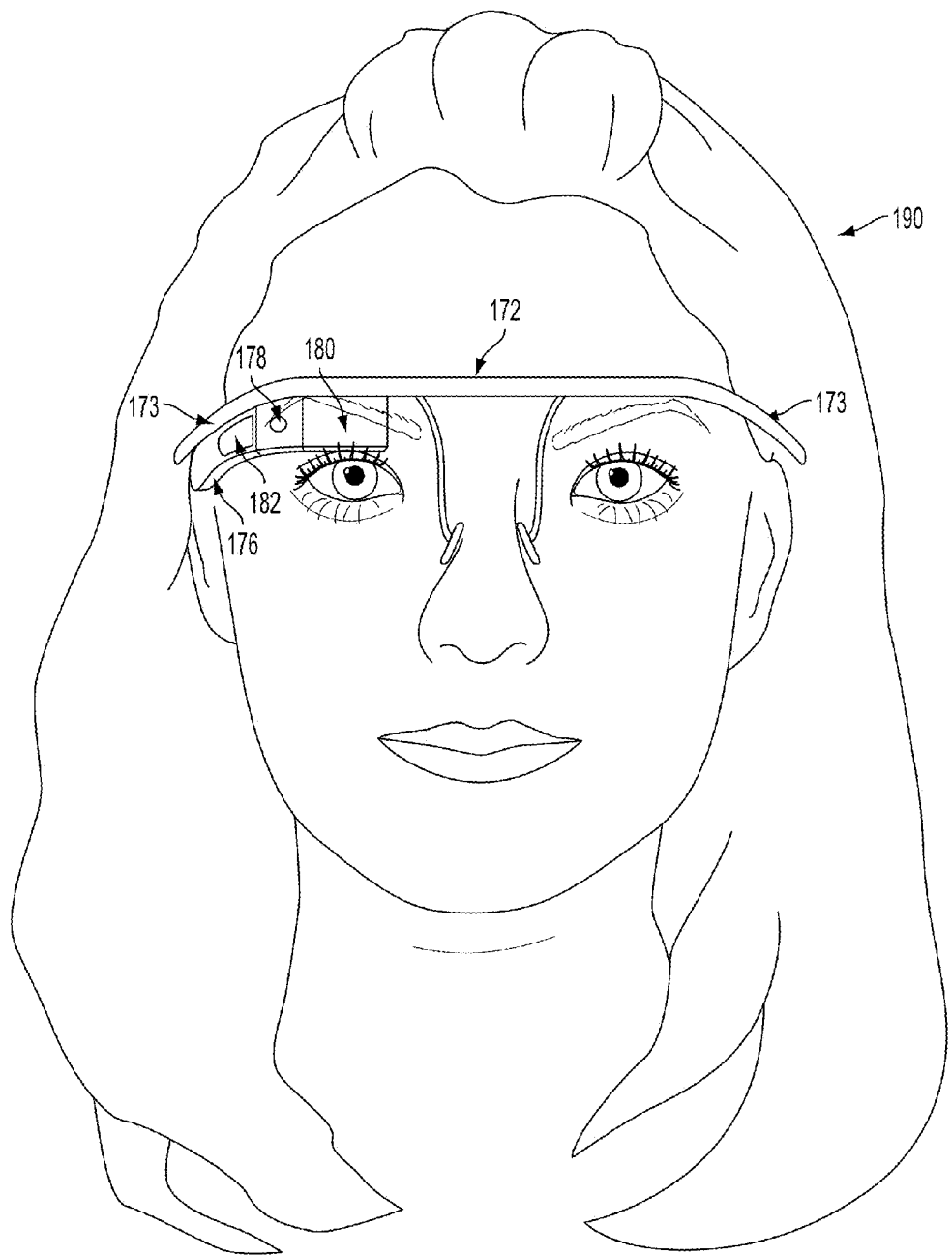
FIGS. 1E to 1G are simplified illustrations of the wearable computing system shown in FIG. 1D, being worn by a wearer, according to an example embodiment.
Figure 1F:
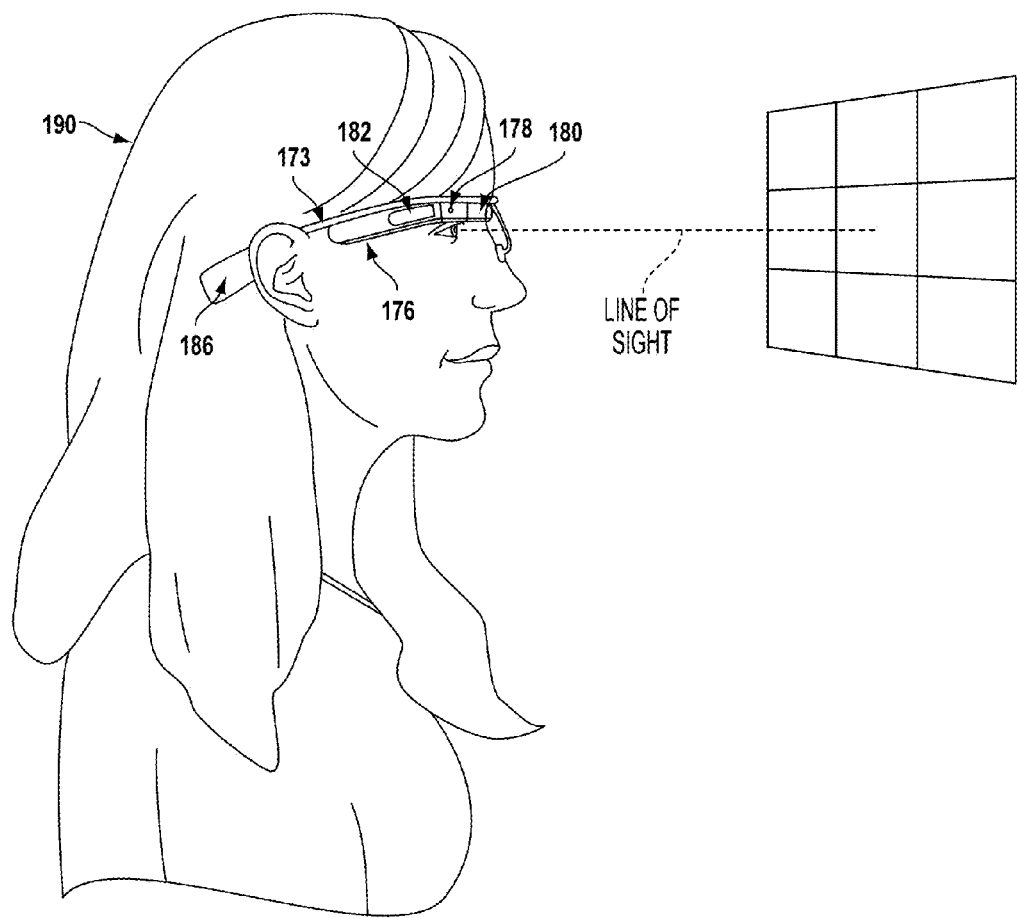
Figure 1G:
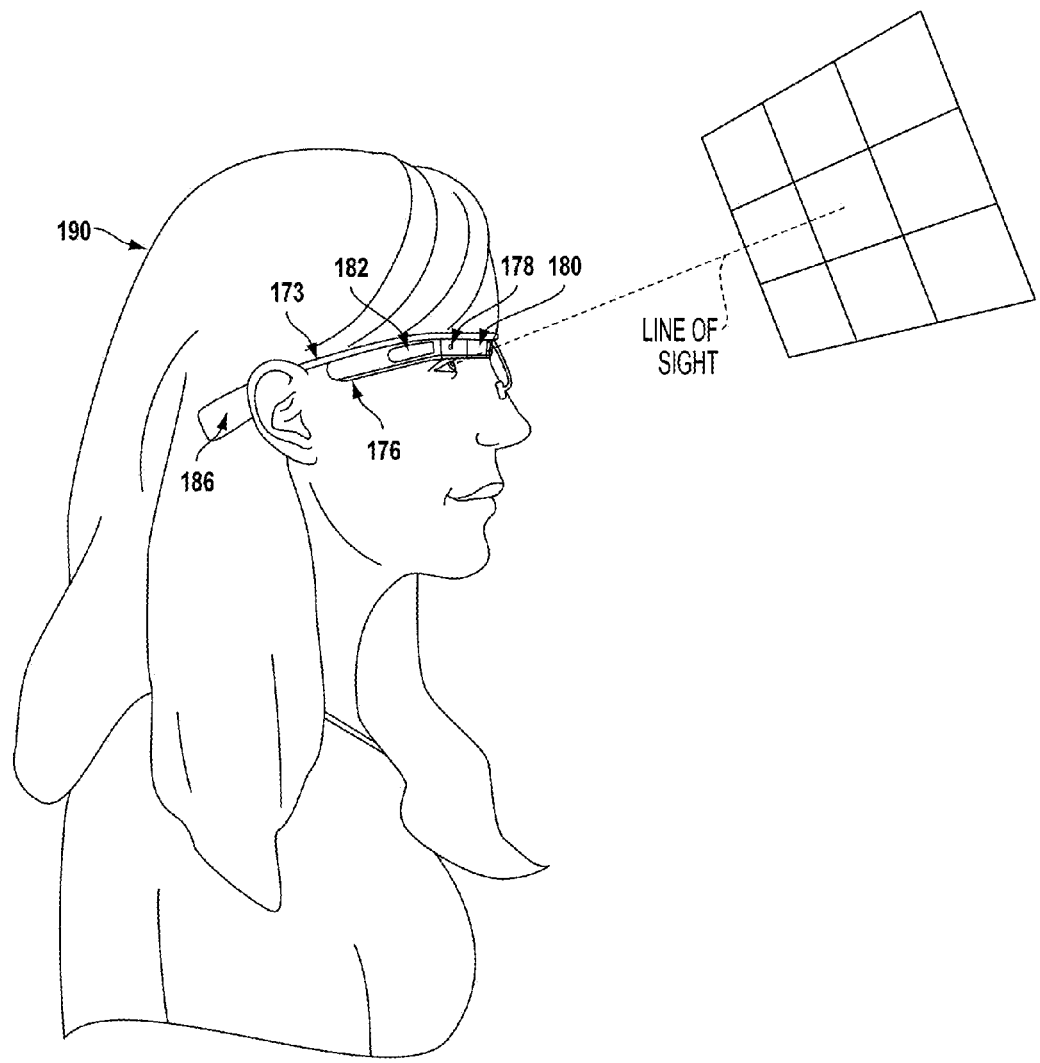

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

FIG. 2 is a simplified block diagram a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mounted devices 102, 152, or 172 described with reference to FIGS. 1A to 1G.

Thus, the device 210 may include a display system 212 that includes a processor 214 and a display 216. The display 210 may be, for example, an optical see-through display, an optical see-around display, or a video see-through display. The processor 214 may receive data from the remote device 230, and configure the data for display on the display 216. The processor 214 may be any type of processor, such as a microprocessor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

Figure 2B:
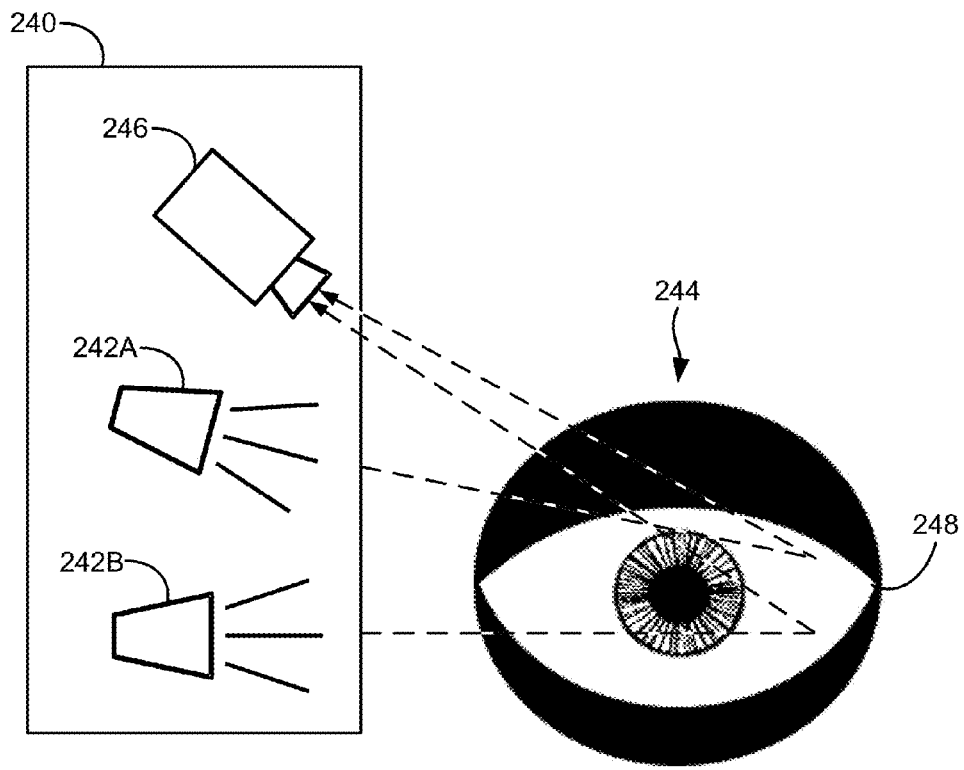
FIG. 2B is a simplified block diagram of an eye gesture detection system according to an example embodiment.

FIG. 2B illustrates an example of an eye gesture-detection system 240 interacting with an eye area 244. The eye area 244 may include the eye surface, eyelids, and portions of the face around the eye. The eye gesture-detection system 240 includes two light sources 242A and 242B that are configured to provide light (light shown as dashed lines) to the eye area 244, and a light sensor 246 that is configured to detect reflected light (also shown as dashed lines) from the eye area 244. The eye gesture-detection system 240 may further include a processing unit (not shown in FIG. 2) that may perform computing functions. In particular, the processing unit may control the light sources 242A-B, receive readings from the light sensor 246, may process the readings to determine aspects of the eye area 244, or perform combinations of these functions, among other functions.

The eye gesture-detection system 240 is shown to use two light sources 242A-B to provide light to the eye area 244. While two light sources are shown, in general, an eye gesture-detection system may use any suitable number of light sources to illuminate the eye area. Further, some eye gesture-detection systems include no light sources. Instead, these systems may detect ambient light or other illumination coming from the eye area.

In eye gesture-detection systems using light sources, the light sources may be any type of light source. For example, the light sources may be light-emitting diodes (LEDs), laser diodes, incandescent sources, gas discharge sources, or combinations of these light sources, among other types of light sources. The light sources may be integrated with the system or externally connected to the system, and may be driven by a light sensor or a processing unit. The light sources may emit light of any suitable frequency or intensity. The light sources may emit light at an intensity that is in a range that is safe for the eye of a user. In addition, the light sources may produce light at a wave frequency that renders the light invisible to humans in order to avoid irritating the user. An eye gesture-detection system may use light sources that produce infrared light, near-infrared light, or the like. In some embodiments, an eye gesture-detection system may use visible light or high-intensity light, depending on the desired configuration of the eye gesture-detection system.

In some embodiments, the light sources may be configured to aim at specific portions of the eye area. For example, the light sources 242A-B are configured to aim at an upper portion and a lower portion of the eye, respectively, near an inside corner 248 of the eye. In other cases, a single light source may be configured to illuminate the whole eye area or a part of the eye area, such as, one eyelid or the center of the eye, for example. As another example, several light sources may be configured to each aim at respective various points on the eye area, illuminating the eye at each of the various points. Light sources may also be configured to differ in the amount of the eye area to which they provide light (termed a spot size). For example, one light source may be configured to have a spot size that provides light to the entire eye area, and another light source may focus on a relatively small point on the eye. Further, the shape of the illuminated area may influence the behavior of the system. For example, if a light source illuminates a narrow horizontal area across the top of the eye area, the amount of reflected light may depend on whether the upper eyelid covers that particular height. As another example, a light source that provides light to the entire eye area may allow an eye gesture-detection system to detect the difference between a completely closed eye and an eye that is almost completely closed.

In addition, a light source may be configured to be used as modulated or pulsed light to distinguish that light source from other light sources and from ambient light. In particular, each light source may be configured to pulse at a particular pattern so that the sensor may determine which light source sent the light based on the on/off pattern of the light. Because ambient light may not follow any such pattern, the light from the system's light sources may be distinguished from ambient-light noise by processing the measured light signal. Note that other light characteristics may be used to distinguish between light sources and/or ambient light. Examples of such light characteristics include frequency (color) and intensity of the light.

In some implementations, in an HMD that uses a light source, the light source may include a structured light scanner. The structured light scanner may be configured both to project light onto one or more surfaces, and to detect the light projection at the one or more surfaces. Of course, in some implementations, the structured light scanner may perform one of these functions, and another device or set of devices may perform the other function. When the HMD is worn, the structured light scanner may be aimed at a wearer's eye area. Accordingly, the structured light scanner may project light onto part or all of the eye area. In addition, the structured light scanner may detect the projected light, and based on the deformation of the detected light relative to the projected light, for example, the scanner may calculate information related to the shape of part or all of the eye area. The information may be calculated on a real-time basis. Accordingly, as the wearer's eye shape changes, the real-time information may be used to detect eye gestures.

The HMD need not include a structured light scanner for carrying out structured light scanning; instead, the HMD may include another device or set of devices configured to carry out structured light scanning, whether that device or set of devices is known or has yet to be developed. In addition, the structured light scanning may be performed with respect to light that is not visible to the human eye (such as, for example, infrared light) or with respect to light that is visible to the human eye. In addition, an HMD may include multiple light scanners, for example, to scan areas at and around both of the wearer's eyes. In a different configuration, an HMD may include a single light scanner that is configured to scan areas at and around both of the wearer's eyes.

Further, the light sources may include elements that allow the system to dynamically change the generated light's frequency, intensity, spot size, shape, focus, or combinations of these properties, among other types of properties. In addition, the light sources may couple with one or more mechanical actuators or servos to facilitate changing the light source's position, light direction, or both. In this way, the system may allow for dynamic calibration and adjustments of the light sources.

The light sensor 246 of the eye gesture-detection system 240 is configured to detect light reflected from the eye area 244. As used in this disclosure, the term "reflected" may refer to a variety of interactions between light and an eye area, including those interactions that direct the light toward a light sensor. Examples of such interactions include mirror reflection, diffuse reflection, and refraction, among other scattering processes. The sensor may be any type of light-sensitive element or device that is capable of outputting a measurable change in response to changes in light intensity. For instance, the sensor may be or include a photodiode, an electro-optical sensor, a fiber-optic sensor, or a photo-detector, among other examples. Further, the sensor may be configured to detect a specified frequency of light or a specified range of frequencies. In some implementations, the sensitivity of the sensor may be designed for specified frequencies and intensities of light.

The sensor may be positioned to detect light reflected from particular portions of the eye area. For example, the sensor may be positioned above the eye to detect light reflecting from the top of the eye when the eye is open, and from the upper eyelid when the eye is closed. In this way, the sensor may detect the amount of the eye that the upper eyelid covers. In some embodiments, the light sensor may be aligned at an oblique angle with respect to the eye area (for example, according to the configuration of the sensor 144 shown in FIG. 1B). In other arrangements, the sensor may point directly at the eye area and may be aimed toward the center of the eye area.

In some arrangements, the system may detect light reflected from a second eye area. For example, the system may receive light data from another light sensor, which may detect light from a user's other eye area. Alternatively, one light sensor may be positioned to detect light from both eye areas.

In addition, the system may adjust and calibrate the behavior of the sensor, for example, by changing the sensor's position, direction, frequency response, sensitivity, detectable area size or shape, or combinations of these, among others. This may be performed based on the context in which the system is used—for example, whether the system is calibrated to a particular user, an intensity of ambient light, the light sources used, a battery level of the device, or the like. For example, the sensor may be coupled to mechanical actuators for changing its position and direction. As another example, the sensor may include changeable filters and baffles for filtering out different frequencies of light.

A sensor that detects light from multiple sources may differentiate between the signals from each light source. For example, if the system uses a different pulsing pattern for each light source, then the sensor may separate signals based on the detected pulsing characteristics of detected light. Additionally, the light sources may alternate when they illuminate the eye area. In such an arrangement, the sensor may associate a measurement of light with a source based on which source was on at the time that the light was measured. If the light sources illuminate different sections of the eye area, then the separate signals may be further associated with the respective eye-area portions. In other arrangements, the sensor may measure a single light intensity based on light from all the sources, without differentiating between the sources.

Examples herein may include or use other eye gesture-detection systems that may include one or more cameras configured to capture video or still images of an eye area. Based on the captured video or still images, a system may recognize movements of the eye and eye area and, in particular, may determine eye gestures. A system may use reference signals from previously proper eye gestures. In one embodiment, the system may compare a captured eye gesture with one or more reference signals to determine the proper action to take according to the comparison.

Other eye gesture-detection systems may use mechanical sensors to detect the motion of the eyelids of a user and, from the detected motion, determine that the user is performing an eye gesture. As an example, an eye gesture-detection system may be equipped with an electromyogram or a similar device that is configured to evaluate electrical activity that is produced by skeletal muscles at the wearer's eye area of interest; such a device may be used, in essence, to "hear" movements of muscles at the eye area. As another example, the eye gesture-detection system may be equipped with a vibration detector that is configured to detect relatively subtle vibrations at the wearer's eye area of interest. This disclosure is not limited to the eye gesture-detection systems discussed above; this disclosure contemplates any eye gesture-detection system that is known or has yet to be developed.

A processing unit in the eye gesture-detection system 240 may be a general-purpose processor, a specialized processor, or both. The processor may be integrated with the light sensor or sources, or the processor may connect to the light sensor and sources through a bus or network connection. Further, the processor may include or connect to a non-transitory computer-readable medium, such as a hard disk, a memory core, a memory drive, a server system, or a combination of these, among others. The computer-readable medium may store at least the program instructions for directing the processor to execute the functions associated with any method provided in this disclosure.

The eye gesture-detection system 240 may include various other elements including, for instance, additional processing, sensing, lighting, or interface elements. Some eye gesture-detection systems may include a motion sensor (a gyroscope or an accelerometer, for example) to detect when the system moves. This may enable the system, for example, to determine whether a change in detected light could be due to a movement of the light sensor, with respect to the eye area, as opposed to a movement of the eyes or eyelids.

In some implementations, the eye gesture-detection system 240 may be integrated in or with a computing system, such as the wearable computing systems discussed above in connection with FIGS. 1A-1D. In these implementations, the wearable computing systems may enable a user to interface with the eye gesture-detection system 240, for example, to specify user preferences, change system settings, perform calibration processes, or perform any combination of these functions, among other functions.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

C. Example Methods

Figure 3:
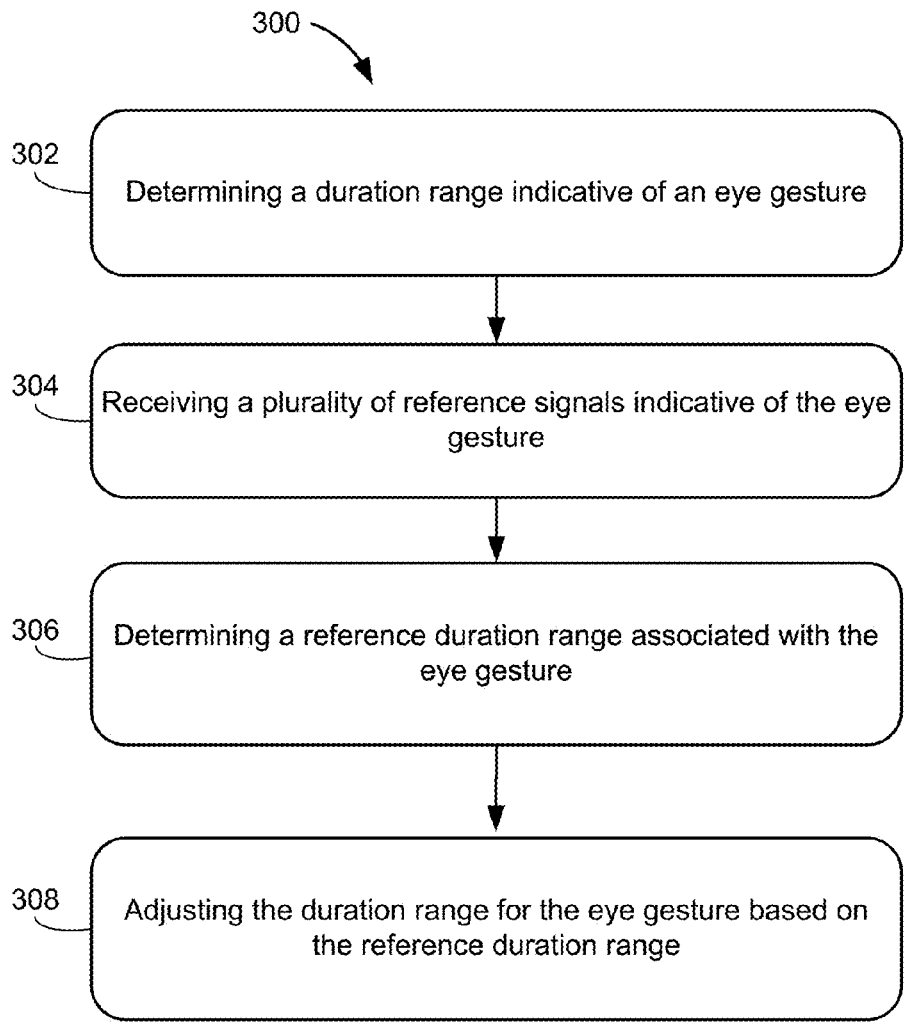
FIG. 3 is a flow chart illustrating an example method for distinguishing winks from other eye motions.

FIG. 3 is a flow chart illustrating an example method for providing calibrations for eye gesture recognition. Method 300 may include one or more operations, functions, or actions as illustrated by one or more of blocks 302-308. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable medium may also be any other volatile or non-volatile storage systems. The computer readable medium may be considered a computer readable storage medium, for example, or a tangible storage device.

Method 300 illustrated in FIG. 3 presents an example of a method that may be performed by a device, such as any devices illustrated in FIGS. 1A-1D, or components of the devices. For example, an HMD may be configured to perform method 300 to adjust a system within the device for eye gesture recognition to improve execution, efficiency, make minor adjustments, or to fix errors within the system. In another example, an HMD may be configured to perform method 300 to update and calibrate the eye gesture recognition or the overall system of the HMD.

In addition, an HMD may be configured to perform method 300 in response to changes in the orientation of the HMD relative to the wearer, such as when the HMD slides down the nose of a wearer, and make appropriate adjustments in response, for example. The HMD may perform method 300 in real-time, a predefined schedule, and/or in intervals. Furthermore, an HMD may determine if the HMD is being worn prior to calibrating the device and may associate the HMD with a particular user-account, since the HMD may be configured to operate differently based on if the HMD is currently on the wearer.

For the sake of example, the method shown in FIG. 3 will be described as implemented by a server in communication with a client device. It should be understood that other entities can implement one or more steps of the example method.

At block 302, the method 300 involves determining a duration range indicative of an eye gesture. An eye gesture recognition system (or proximity system) may be configured to determine a duration range indicative of an eye gesture. The duration range may be a benchmark range and may generally represent a duration range indicative of the particular eye gesture. The particular eye gesture may include any gesture associated with normal eye activity, blinks, winks, or any other type of eye movement. For example, a duration of a wink may be a period associated with a closing of the eye. In some examples, the duration range may be sent by a server or received from a database. For example, a HMD may query a database associated with blink eye gestures and may determine a duration generally associated with blink eye gestures. In other examples the duration range may be determined by an HMD using the eye-gesture detection system described in reference to FIG. 2. The duration may be determined, for example, with the use of image captures, measuring devices, and other types of data extraction methods to find the duration range of the particular eye gesture. In further examples, the duration of the eye gesture may be previously associated with the HMD. For instance, an HMD may be pre-programmed or pre-calibrated to recognize blinks when an eye gesture has a duration range of 100 ms-400 ms.

Figure 4:
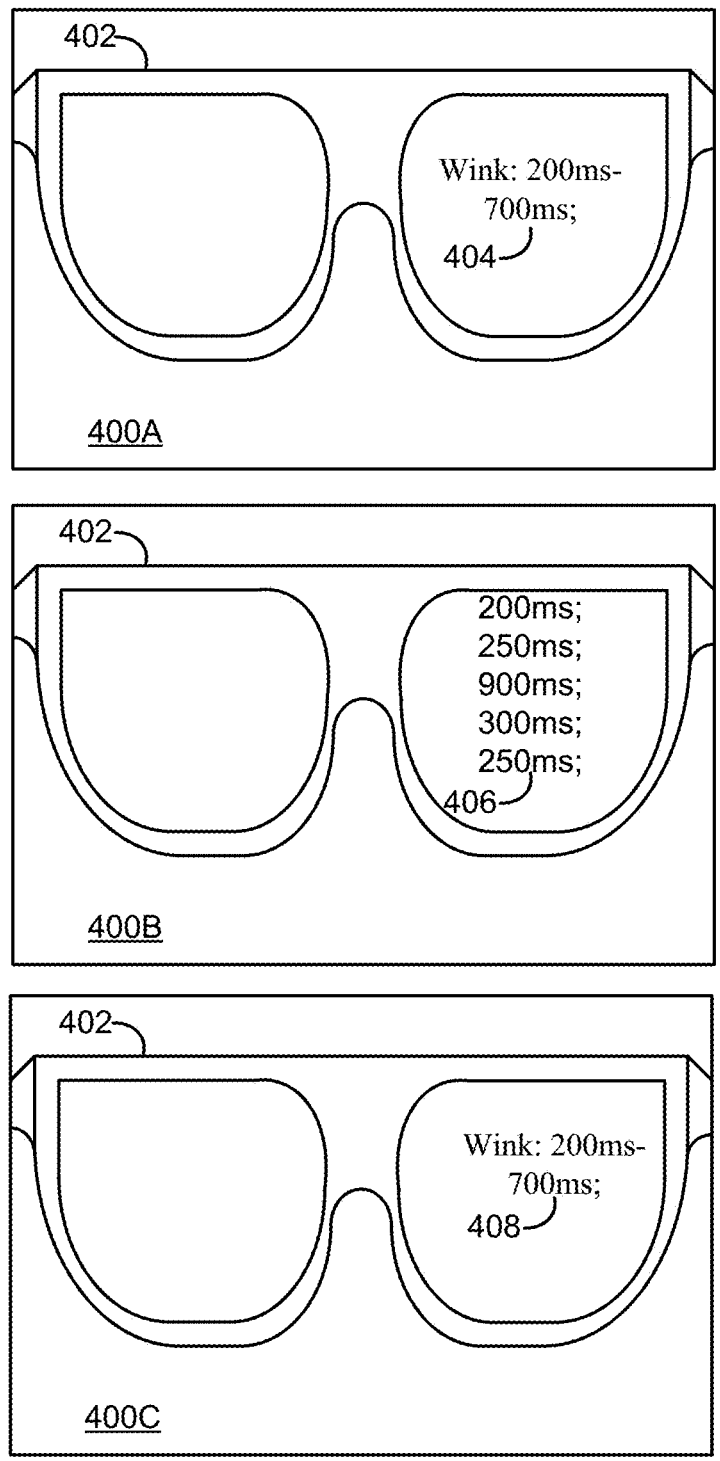
FIG. 4 illustrates a simplified diagram of an HMD performing eye gesture calibration using eye gesture duration according to an example embodiment.

In one particular example, an HMD 402 may determine that a wink eye gesture has a duration range of 200 ms-700 ms, shown as 404 in stage 400A of FIG. 4. FIG. 4 is a simplified block diagram illustrating stages (400A-400C) of HMD 402 as it calibrates the detection of a wink for a particular user.

At block 304, method 300 involves receiving a plurality of reference signals indicative of the eye gesture. After an HMD determines a duration range indicative of an eye gesture, the HMD may use an eye gesture recognition system (such as the one noted above) to detect multiple reference signals indicative of the eye gesture. Each signal may be representative of various parameters derived from characteristics and measurements of the detected eye gesture. Such parameters may include measurements relating to amplitudes of eye motions of the eye gesture, changes in magnitude of the eye gesture, and overall durations of motions of the eye gesture. Additionally, each detection of the eye gesture may produce signals of slightly different amplitudes, frequencies, and measured ranges. Accordingly, the signals may differ based on the types of eye gestures detected and may even differ based on varying detections of the same type of eye gesture.

In one example, an HMD may use an eye-gesture detection system, to detect an eye gesture of a particular user. Each time the eye gesture is detected, an HMD may be configured to determine a reference signal from the detected eye gesture that is representative of parameters (noted above) associated with the eye gesture. Using this process, the HMD may detect a plurality of reference signals indicative of the eye gesture for the particular user.

Moreover, instead of using one eye gesture detector to cover all possible durations of the eye gesture, the known duration range (determined at step 302) may be divided into several sub-ranges. For each sub-range the HMD may utilize one eye gesture detector that may only be responsive to the eye gesture within that duration sub-range. In some example, in attempt to improve robustness, the sub-ranges may have some overlap. For example, an HMD may be configured to detect 300 ms to 800 ms blink eye gestures. To do so, the HMD may include three detectors, which cover, [300 ms, 600 ms], [400 ms, 700 ms], and [500 ms, 800 ms] respectively.

Note this example is an illustration. Many other ways may be used to divide the sub-ranges and are contemplated herein.

Returning to the example illustrated in FIG. 4, HMD 402 may be configured to detect 200 ms to 700 ms wink eye gestures, as noted above. HMD 402 may include three detectors, which cover [200 ms, 500 ms], [300 ms, 600 ms], and [400 ms, 700 ms]. HMD 402 may continuously (e.g., over a specified period of time) detect different signals that represent the wink eye gesture, but may have slightly varying sensor data and parameters. For example, HMD 402 may detect multiple winks for a particular user and each wink may have a slightly different duration. As shown in stage 400B of FIG. 4, HMD 402 may detect five reference signals 406 that include duration information indicating that the particular user wearing HMD 402 may have wink durations of: 200 ms; 250 ms; 900 ms; 300 ms; and 250 ms.

At block 306, once the reference signals with duration information have been determined, method 300 further involves determining a reference duration range associated with the eye gesture. The reference duration range may, for example, be a subset (i.e., be within) the known duration range determined at block 302, and may be determined based on the plurality of reference durations determined at block 304. For example, an HMD may use the various reference signals detected at block 304, and based on those signals may estimate a calibration duration as a reference to pick one of the several sub-ranges that may include a duration that matches the calibration duration best. In some examples, the estimation may be an average of all of the duration ranges of the detected signals; however, other estimation methods may be used as well.

To improve the results of the estimation of the calibration duration, an HMD may reject false positives of an eye gesture detection using the obtained duration information. For example, an HMD may determine, based on the plurality of reference durations, an average reference duration of the eye gesture and compare the average reference duration to each reference duration of the plurality of reference durations based on a variance (average of the squared differences from the mean) in duration. Using this information, an HMD may determine whether a particular reference duration is larger than the average reference duration plus the variance in duration, and if so eliminate the particular reference duration when estimating the calibration reference duration. Conversely, the HMD may determine whether a particular reference duration is smaller than the average reference duration minus the variance in duration, and if so eliminate the particular reference duration when estimating the calibration reference duration. Note, using an average and variance is only an example of a statistical distribution that may be used to reject false positives and is not intended to be limiting. Other statistical distributions may be used to analyze and improve the results of the calibration duration and are contemplated herein.

In some examples, to improve the results of the estimation of the calibration duration, an HMD may reject false positives of an eye gesture by determining whether a particular reference duration of the plurality of reference durations is outside of an expected duration range. The expected duration range may be determined based on a function of a statistical distribution of the plurality of reference durations. When determining the reference duration range, the HMD may discarding the particular reference based on the particular reference being outside of the expected duration range.

Returning to the scenario illustrated in FIG. 4, for example, the calibration wink duration for the user may be estimated at 250 ms (e.g., an average of the wink durations 406 disregarding wink detection duration 900 ms because 900 ms is greater than the average of the remaining durations plus the variance of the wink durations), then the wink detector for [200 ms, 600 ms] may be active, and [300 ms, 600 ms], and [400 ms, 700 ms] detectors may be inactive. Accordingly, the wink detection range for the particular user of HMD 402 may be calibrated to be 200 ms-600 ms.

At block 308, method 300 involves adjusting the duration range for the eye gesture based on the duration range. After the computer system determines a reference duration range associated with the eye gesture, the computer system may adjust the duration range for the for the eye gesture based on the duration range. To do so, the computer system may change the duration range in a manner so as to make the duration range equivalent to the duration range. Alternatively, the computer system may adjust the duration range for the eye gesture based on the duration range by calibrating the HMD to be configured to recognize a signal comprising the duration range as being indicative of the eye gesture.

In the scenario illustrated in FIG. 4, HMD 402 may adjust the wink duration range to be 200 ms-600 ms, shown in stage 400C as 408.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium. In addition, circuitry may be provided that is wired to perform logical functions in any processes or methods described herein.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and examples have been disclosed herein, other aspects and examples will be apparent to those skilled in the art. The various aspects and examples disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

We claim:

1. A method comprising:
   receiving, by a computing device, a plurality of reference signals indicative of an eye gesture, wherein each reference signal has a corresponding reference duration;
   comparing the reference durations to a plurality of predetermined sub-ranges that collectively span a predetermined duration range corresponding to the eye gesture;
   determining, based on the comparison, at least one of the plurality of sub-ranges to be a reference duration sub-range for use to detect the eye gesture; and
   adjusting a detection process for the eye gesture to use the at least one reference duration sub-range to detect the eye gesture.

2. The method of claim 1, further comprising:
   determining, based on the reference durations, an average reference duration of the eye gesture; and
   comparing the reference durations to the average reference duration based on a variance in duration, wherein the variance in duration is indicative of a length of time spanning the durations,
   wherein comparing the reference durations to the plurality of predetermined sub-ranges is based at least in part on the comparison of the reference durations to the average reference duration.

3. The method of claim 2, further comprising:
   determining whether a particular reference duration of the reference durations is outside of an expected duration range, wherein the expected duration range is determined based on a function of a statistical distribution of the reference durations; and
   based on the particular reference duration being outside of the expected duration range, discarding the particular reference duration from the comparison of the reference durations to the plurality of predetermined sub-ranges.

4. The method of claim 2, further comprising:
   determining whether a particular reference duration of the reference durations is larger than the average reference duration plus the variance in duration; and
   based on the particular reference duration being larger than the average reference duration plus the variance in duration, discarding the particular reference duration from the comparison of the reference durations to the plurality of predetermined sub-ranges.

5. The method of claim 2, further comprising:
   determining whether a particular reference duration of the reference durations is smaller than the average reference duration minus the variance in duration; and
   based on the particular reference duration being smaller than the average reference duration minus the variance in duration, discarding the particular reference duration from the comparison of the reference durations to the plurality of predetermined sub-ranges.

6. The method of claim 1,
   wherein the computing device comprises an HMD, and
   wherein adjusting the detection process for the eye gesture to use the at least one reference duration sub-range to detect the eye gesture comprises calibrating the HMD to be configured to recognize a signal that corresponds to the at least one reference duration sub-range as being indicative of the eye gesture.

7. The method of claim 6, wherein the eye gesture comprises a wink.

8. The method of claim 1, wherein the at least one reference duration sub-range is associated with a particular user-account.

9. The method of claim 1,
   wherein each reference duration comprises a respective first time period associated with a closing of an eye, and
   wherein each of the at least one reference duration sub-range comprises a respective second time period associated with a closing of the eye.

10. A system comprising:
- a head mountable device (HMD) configured to receive a plurality of reference signals indicative of an eye gesture from a device coupled to the HMD;
- a non-transitory computer-readable medium; and
- program instructions stored on the non-transitory computer-readable medium and executable by at least one processor to perform functions comprising:
  - receiving a plurality of reference signals indicative of the eye gesture, wherein each reference signal has a corresponding reference duration;
  - comparing the reference durations to a plurality of predetermined sub-ranges that collectively span a predetermined duration range corresponding to the eye gesture;
  - determining, based on the comparison, at least one of the plurality of sub-ranges to be a reference duration sub-range for use to detect the eye gesture; and
  - adjusting a detection process for the eye gesture to use the at least one reference duration sub-range to detect the eye gesture.

11. The system of claim 10, wherein the functions further comprise:
- determining, based on the reference durations, an average reference duration of the eye gesture; and
- comparing the reference durations to the average reference duration based on a variance in duration, wherein the variance in duration is indicative of a length of time spanning the durations,
- wherein comparing the reference durations to the plurality of predetermined sub-ranges is based at least in part on the comparison of the reference durations to the average reference duration.

12. The system of claim 11, wherein the functions further comprise:
- determining whether a particular reference duration of the reference durations is outside of an expected duration range, wherein the expected duration range is determined based on a function of a statistical distribution of the reference durations; and
- based on the particular reference duration being outside of the expected duration range, discarding the particular reference duration from the comparison of the reference durations to the plurality of predetermined sub-ranges.

13. The system of claim 11, wherein the functions further comprise:
- determining whether a particular reference duration of the reference durations is larger than the average reference duration plus the variance in duration; and
- based on the particular reference duration being larger than the average reference duration plus the variance in duration, discarding the particular reference duration from the comparison of the reference durations to the plurality of predetermined sub-ranges.

14. The system of claim 11, wherein the functions further comprise:
- determining whether a particular reference duration of the reference durations is smaller than the average reference duration minus the variance in duration; and
- based on the particular reference duration being smaller than the average reference duration minus the variance in duration, discarding the particular reference duration from the comparison of the reference durations to the plurality of predetermined sub-ranges.

15. The system of claim 10, wherein the function of adjusting the detection process for the eye gesture to use the at least one reference duration sub-range to detect the eye gesture comprises calibrating the HMD to be configured to recognize a signal that corresponds to the at least one reference duration sub-range as being indicative of the eye gesture.

16. A non-transitory computer readable medium having stored therein instructions, that when executed by a computing device, cause the computing device to perform functions comprising:
- receiving a plurality of reference signals indicative of an eye gesture, wherein each reference signal has a corresponding reference duration;
- comparing the reference durations to a plurality of predetermined sub-ranges that collectively span a predetermined duration range corresponding to the eye gesture;
- determining, based on the comparison, at least one of the plurality of sub-ranges to be a reference duration sub-range for use to detect the eye gesture; and
- adjusting a detection process for the eye gesture to use the at least one reference duration sub-range to detect the eye gesture.

17. The non-transitory computer readable medium of claim 16, wherein the functions further comprise:
- determining, based on the reference durations, an average reference duration of the eye gesture; and
- comparing the reference durations to the average reference duration based on a variance in duration, wherein the variance in duration is indicative of a length of time spanning the durations,
- wherein comparing the reference durations to the plurality of predetermined sub-ranges is based at least in part on the comparison of the reference durations to the average reference duration.

18. The non-transitory computer readable medium of claim 16, wherein the functions further comprise:
- determining whether a particular reference duration of the reference durations is outside of an expected duration range, wherein the expected duration range is determined based on a function of a statistical distribution of the reference durations; and
- based on the particular reference duration being outside of the expected duration range, discarding the particular reference duration from the comparison of the reference durations to the plurality of predetermined sub-ranges.

\* \* \* \* \*